(12) United States Patent
Higgins et al.

(10) Patent No.: US 10,440,900 B1
(45) Date of Patent: Oct. 15, 2019

(54) GROW LIGHT WITH ADJUSTABLE HEIGHT AND EMISSION SPECTRUM

(71) Applicant: Calyx Cultivation Tech. Corp., Houston, TX (US)

(72) Inventors: John Higgins, Houston, TX (US); James Higgins, Conroe, TX (US)

(73) Assignee: Calyx Cultivation Tech. Corp., Houston, TX (US)

( * ) Notice: Subject to any disclaimer, the term of this patent is extended or adjusted under 35 U.S.C. 154(b) by 0 days.

(21) Appl. No.: 16/253,907

(22) Filed: Jan. 22, 2019

(51) Int. Cl.
*A01G 7/04* (2006.01)
*H05B 33/08* (2006.01)
*H05B 37/02* (2006.01)
*A01G 9/20* (2006.01)
*G06K 7/10* (2006.01)
*G06K 19/07* (2006.01)
*G05D 25/02* (2006.01)

(52) U.S. Cl.
CPC .............. *A01G 7/045* (2013.01); *A01G 9/20* (2013.01); *G05D 25/02* (2013.01); *G06K 7/10366* (2013.01); *G06K 19/0723* (2013.01); *H05B 33/0842* (2013.01); *H05B 37/0272* (2013.01)

(58) Field of Classification Search
CPC . A01G 7/045; A01G 7/02; A01G 7/04; H05B 37/0272
See application file for complete search history.

(56) References Cited

U.S. PATENT DOCUMENTS

| 5,012,609 A | 5/1991 | Ignatius et al. |
| 5,278,432 A | 1/1994 | Ignatius et al. |
| 8,074,397 B2 | 12/2011 | Yoneda |
| 8,297,782 B2 | 10/2012 | Bafetti |

(Continued)

FOREIGN PATENT DOCUMENTS

| CA | 2856725 | 6/2013 |
| CN | 201797809 | 4/2011 |

(Continued)

OTHER PUBLICATIONS

Argyroudi-Akoyunoglou et al., "Photoinduced Changes in the Chlorophyll a to Chlorophyll b Ratio in Young Bean Plants," Plant Physiology, Aug. 1970, 46(2), pp. 247-249.

(Continued)

*Primary Examiner* — Douglas W Owens
*Assistant Examiner* — Syed M Kaiser
(74) *Attorney, Agent, or Firm* — Lewis & Reese, PLLC

(57) ABSTRACT

A grow light system is disclosed that can produce an adjustable combined emission spectrum, as is useful to growing plants of different types, or as is useful to adjusting the spectrum provided to a given plant as it grows. The grow light can include a sensor system to detect the height of plants it is illuminating, and can via a cable hoist adjust the height of the grow light to maintain an optimal distance between the plants and the grow light. The grow light system preferably includes a computer device with a graphical user interface useable to set a plant-to-grow light distance, and/or to select a combined emission spectrum for the grow light, which may occur by selecting a particular plant type, variety, or group. The system may include a library of optimal settings to configure the system to optimally grow each selected plant type, variety, or group.

24 Claims, 10 Drawing Sheets

(56) References Cited

U.S. PATENT DOCUMENTS

| | | | |
|---|---|---|---|
| 8,302,346 B2 | 11/2012 | Hunt et al. | |
| 8,453,376 B2 | 6/2013 | Chen | |
| 9,145,590 B2 * | 9/2015 | Evans | A61D 19/00 |
| 9,162,077 B2 | 10/2015 | Nigola et al. | |
| 9,681,515 B2 | 6/2017 | Rantala | |
| 9,750,105 B2 | 8/2017 | Rantala | |
| 2006/0261742 A1 | 11/2006 | Ng et al. | |
| 2010/0244724 A1 | 9/2010 | Jacobs et al. | |
| 2012/0068615 A1 * | 3/2012 | Duong | A01G 7/045 315/192 |
| 2013/0139437 A1 | 6/2013 | Maxik | |
| 2013/0194795 A1 | 8/2013 | Onaka | |
| 2013/0318869 A1 | 12/2013 | Aikala | |
| 2014/0034991 A1 | 2/2014 | McKenzie et al. | |
| 2014/0152194 A1 | 6/2014 | Beyer | |
| 2015/0083221 A1 * | 3/2015 | Boonekamp | A01G 7/045 136/259 |
| 2015/0196002 A1 * | 7/2015 | Friesth | A01G 22/00 47/62 R |
| 2015/0342125 A1 * | 12/2015 | Krijn | A01G 7/045 315/152 |
| 2016/0088802 A1 * | 3/2016 | Nicole | A01G 7/045 47/58.1 LS |
| 2017/0014538 A1 | 1/2017 | Rantala | |
| 2018/0147417 A1 | 5/2018 | Rantala | |
| 2018/0224093 A1 * | 8/2018 | Dutta | A01G 22/00 |

FOREIGN PATENT DOCUMENTS

| | | |
|---|---|---|
| CN | 103947469 | 7/2014 |
| CN | 103947470 | 7/2014 |
| JP | S6420034 | 1/1989 |
| WO | 02/067660 | 9/2002 |
| WO | 2009/045107 | 4/2009 |
| WO | 2013/141824 | 9/2013 |
| WO | 2014/188303 | 11/2014 |

OTHER PUBLICATIONS

Beelmann et al., "Post-harvest Vitamin D Enrichment of Fresh Mushrooms," HAL Project # MU07018, Apr. 30, 2009, Penn State University.

Carvalho et al., "Sequential Light Programs Shape Kale (*Brassica napus*) Sprout Appearance and Alter Metabolic and Nutrient Content," Horticulture Research 1, Article No. 8, 2014.

Eytan et al., "Changes in Photosystem I Activity and Membrane Organization During Degreening and Greening of a Chlamydomonas Reinhardi Mutant, y-1," The Journal of Biological Chemistry, vol. 249, No. 3, Issue of Feb. 10, , p. 738-744, 1974.

Kleuter et al., "Photosynthesis in Cucumbers with Pulsed or Continuous Light," Transactions of the ASABE, 23(2): 0437-0442, 1980.

Lefsrud et al., "Irradiance from Distinct Wavelength Light-Emitting Diodes Affect Secondary Metabolites in Kale," HortScience, vol. 43, No. 7, pp. 2243-2244, 2008.

Nicklisch, Andreas, "Growth and Light Absorption of Some Planktonic Cyanobacteria, Diatoms and Chlorophyceae Under Stimulated Natural Light Fluctuations," Journal of Plankton Research, vol. 20, Issue 1, pp. 105-119, 1998.

Olle et al., "The Effects of Light-Emitting Diode Lighting on Greenhouse Plant Growth and Quality," Agricultural and Food Science, vol. 22, No. 2, pp. 223-234, 2013.

Sforza et al., "Adjusted Light and Dark Cycles Can Optimize Photosynthetic Efficiency in Algae Growing in Photobioreactors," PLos ONE, 7(6): 2012.

Tennessen et al. "Efficiency of Photosynthesis in Continuous and Pulsed Light Emitting Diode Irradiation," Photosynthesis Research, 44(3), pp. 261-269, 1995.

Vänninen et al. "Prospecting the Use of Artificial Lighting for Integrated Pest Management," ISHS Acta Horticulturae, 956, pp. 593-608, 2010.

Yeh et al., "High-Brightness LEDs—Energy Efficient Lighting Sources and their Potential in Indoor Plant Cultivation," Renewable and Sustainable Energy Reviews, vol. 13, Issue 8, pp. 2175-2180, 2009.

* cited by examiner

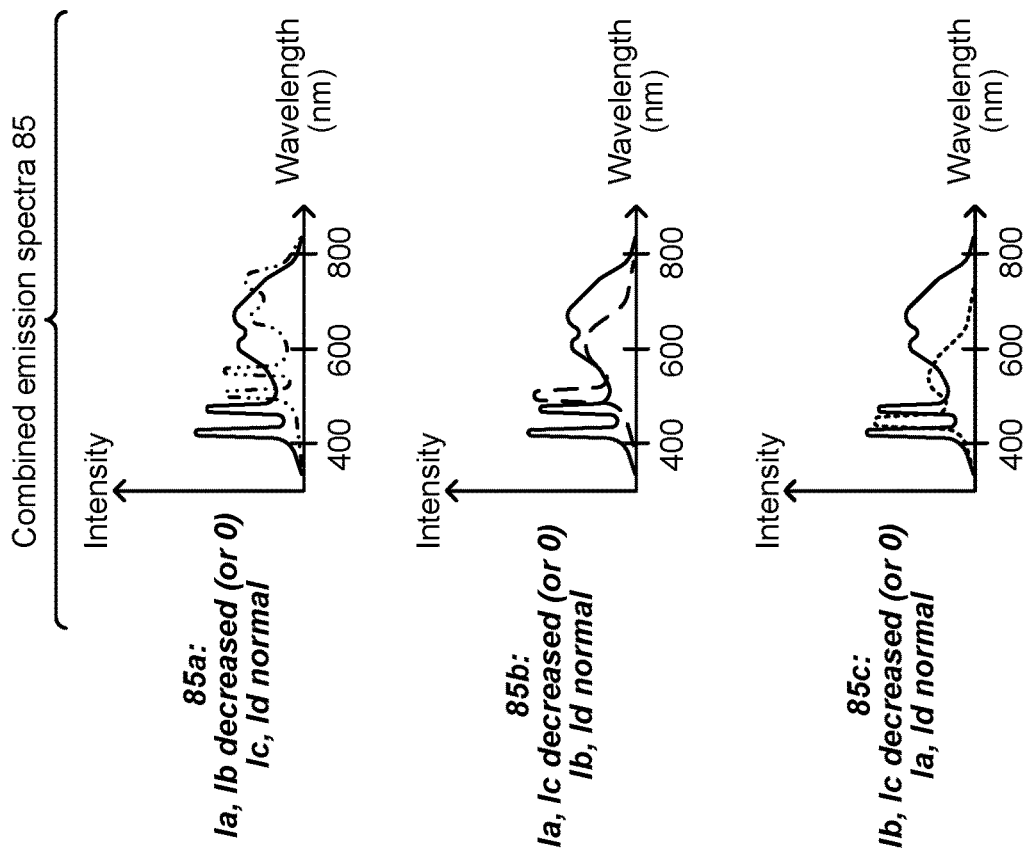

GROW LIGHT WITH ADJUSTABLE HEIGHT AND EMISSION SPECTRUM

FIELD OF THE INVENTION

This application relates to programmable grow light systems useable to grow different types of plants.

INTRODUCTION

It is known in the art that most plants normally requiring sunlight to grow can be grown indoors using a grow light. A grow light generally speaking comprises a lighting fixture with a particular emission spectrum that matches the emission spectrum of sunlight to some degree, and at least sufficiently enough to allow plants to grow. Typically, a grow light is positioned above plants that are being grown.

The inventors see room for improvement in grow lights. Specifically, the inventors notice that traditional grow lights can be rigid in their applications. For example, a particular grow light may be designed that produces a single emission spectrum. Such a fixed emission spectrum may be optimal for growing a single type of plant (e.g., lettuce), but may not work well to grow different types of plants (e.g., tomatoes, parsley, *cannabis*, etc.), because different plants may grow more optimally using different spectra that increase or decrease the intensity of certain wavelengths of light in the spectra.

Further, the inventors note that certain plants may require different emission spectrums at different phases of their growing cycles, which a grow light with a fixed emission spectrum cannot provide. For example, a seedling of a plant may grow optimally using a first spectrum having certain wavelengths whose intensities are accentuated or diminished. After the plant has grown to a more-mature state, it may now grow optimally using a second emission spectrum with different wavelengths accentuated or diminished. Optimizing growth of the plant by adjusting its spectra during different growth phases may for example enhance the production of certain nutrients or chemicals that enhance the flavor of the plants, or keep the plants from becoming damaged because certain wavelength that encourage growth during one growth phase may damage the plants during a different growth phase.

Also, the inventors note that the distance of the grow light to the plants can be a significant factor in how well the plants will grow during their life phases. Plants typically grow vertically, meaning that the distance from the grow light to the plant will decrease over time. If the height of the grow light is not manually adjusted as the plants grow, the plants will receive higher intensities of the emission spectrum the light produces, which may over-expose the plants and inhibit healthy growth during later growth phases. The inventors recognize that this issue can be addressed by adjusting the height of the grow light vertically upward as the plant grows. However, in a large grow farm setting in which many grow lights may be used, such manual adjustment can be laborious.

SUMMARY

A grow light system is disclosed, which may comprise: a grow light positionable over plants growing underneath, wherein the grow light comprises a circuit board, wherein the circuit board comprises a plurality of groups, wherein each group comprises a plurality of light emitters, wherein each group is configured to be driven with a unique current to cause the light emitters in that group to produce an individual emission spectrum that is different from the individual emission spectra produced by the light emitters in other groups, the sum of the individual emission spectrum from each group producing a combined emission spectrum; and at least one non-transitory computer readable medium configured to operate within a computer device in communication with the grow light, wherein the at least one non-transitory computer readable medium comprises: a library, wherein the library includes a plurality of plants, wherein each plant is associated in the library with values for the unique currents for each of the groups, and a grow light system software program configured when executed on the computer device to receive at the computer device a selection of a plant from the library, and in response to the selected plant, cause the computer device to transmit the values for the unique currents associated with the selected plant to the grow light to produce the combined emission spectrum.

In one example, the system includes the computer device, and wherein the at least one non-transitory computer readable medium is within the computer device. In one example, the plurality of light emitters in each group are divided between a plurality of light emitting regions on the circuit board. In one example, the plurality of light emitting regions in each group are driven in parallel by the unique current for that group. In one example, there are a plurality of light emitters in each of the plurality of light emitting regions in each group. In one example, the plurality of light emitters in each of the plurality of light emitting regions are connected in series. In one example, the software program is configured to cause the computer device to transmit the values for the unique drive currents wirelessly. In one example, the values for the unique currents for each of the groups is constant. In one example, the values for the unique currents for each of the groups varies as a function of time or as a function of a height of the plants growing underneath. The system may further comprising an elevator system configured to raise and lower the grow light over the plants. In one example, the elevator system comprises a cable hoist, wherein the cable hoist is configured to suspend the grow light from a cable and to raise and lower the grow light by respectively retracting and extending the cable. The system may further comprise a proximity sensor located on or within the grow light, wherein the proximity sensor is configured to determine a distance between the grow light and the plants growing underneath. In one example, the software program is configured to cause the computer device to receive the determined distance from the proximity sensor. In one example, each plant is further associated in the library with an optimal distance between the between the grow light and the plants growing underneath. In one example, the optimal distance is constant. In one example, the optimal distance varies as a function of time or as a function of a height of the plants growing underneath. In one example, the software program is further configured to cause the computer device to transmit data to the elevator system to allow the elevator system to raise or lower the grow light so that the measured distance equals the optimal distance. In one example, the light emitters in at least one of the groups produces an individual emission spectrum with a peak at a wavelength that is disruptive to microbial growth. In one example, the wavelength is approximately 405 nm. The system may further comprise a security sensor system located at least partially on or within the grow light, wherein the security sensor system is configured to determine the position or location of the plants growing underneath, and wherein the software program is configured to cause the computer device to receive the determined position or location. In one example, the security sensor system comprises a Radio Frequency Identification (RFID) reader. In one example, the security sensor system further comprises RFID tags attachable to the plants growing underneath. The system may further comprise a spectral analysis sensor located on or within the grow light, wherein the spectral analysis sensor is configured to determine the intensity of the produced combined emission spectrum at at least a plurality of wavelengths, and wherein the software program is configured to cause the computer device to receive the determined intensities. The system may further comprise an Infra-Red (IR) sensor located on or within the grow light, wherein the IR sensor is configured to determine the temperature of the plants growing underneath, and wherein the software program is configured to cause the computer device to receive the determined temperature.

A grow light system is disclosed, which may comprise: a grow light positionable over plants growing underneath, wherein the grow light comprises a circuit board, wherein the circuit board comprises a plurality of groups, wherein each group comprises a plurality of light emitters, wherein each group is configured to be driven with a unique current to cause the light emitters in that group to produce an individual emission spectrum that is different from the individual emission spectra produced by the light emitters in other groups, the sum of the individual emission spectrum from each group producing a combined emission spectrum; and a computer device, comprising: memory storing a library, wherein the library includes a plurality of plants, wherein each plant is associated in the memory with values for the unique currents for each of the groups, and a grow light system software program, wherein the software program is configured to receive at the computer device a selection of a plant from the library, and in response to the selected plant, transmit the values for the unique currents associated with the selected plant from the computer device to the grow light to produce the combined emission spectrum.

In one example, the plurality of light emitters in each group are divided between a plurality of light emitting regions on the circuit board. In one example, the plurality of light emitting regions in each group are driven in parallel by the unique current for that group. In one example, there are a plurality of light emitters in each of the plurality of light emitting regions in each group. In one example, the plurality of light emitters in each of the plurality of light emitting regions are connected in series. In one example, the software program is configured to transmit the values for the unique drive currents from the computer device to the grow light wirelessly. In one example, the values for the unique currents for each of the groups is constant. In one example, the values for the unique currents for each of the groups varies as a function of time or as a function of a height of the plants growing underneath. The system may further comprise an elevator system configured to raise and lower the grow light over the plants. In one example, the elevator system comprises a cable hoist, wherein the cable hoist is configured to suspend the grow light from a cable and to raise and lower the grow light by respectively retracting and extending the cable. The system may further comprise a proximity sensor located on or within the grow light, wherein the proximity sensor is configured to determine a distance between the grow light and the plants growing underneath. In one example, the proximity sensor is configured to transmit the determined distance to the computer device. In one example, each plant is further associated in the memory with an optimal distance between the between the grow light and the plants growing underneath. In one example, the optimal distance is constant. In one example, the optimal distance varies as a function of time or as a function of a height of the plants growing underneath. In one example, the software program is further configured to transmit data to the elevator system to allow the elevator system to raise or lower the grow light so that the measured distance equals the optimal distance. In one example, the light emitters in at least one of the groups produces an individual emission spectrum with a peak at a wavelength that is disruptive to microbial growth. In one example, the wavelength is approximately 405 nm. The system may further comprise a security sensor system located at least partially on or within the grow light, wherein the security sensor system is configured to determine the position or location of the plants growing underneath and to transmit the determined position or location to the computer device. In one example, the security sensor system comprises a Radio Frequency Identification (RFID) reader. In one example, the security sensor system further comprises RFID tags attachable to the plants growing underneath. The system may further comprise a spectral analysis sensor located on or within the grow light, wherein the spectral analysis sensor is configured to determine the intensity of the produced combined emission spectrum at at least a plurality of wavelengths, and is configured to transmit the determined intensities to the computer device. The system may further comprise an Infra-Red (IR) sensor located on or within the grow light, wherein the IR sensor is configured to determine the temperature of the plants growing underneath, and is configured to transmit the determined temperature to the computer device.

BRIEF DESCRIPTION OF THE DRAWINGS

FIGS. 5A and 5B show examples in which the different light emitters are broad-band light emitters, and again shows adjustment to the individual emission spectra to create an adjustable combined emission spectrum.

DETAILED DESCRIPTION

To address the concerns of conventional grow light systems as discussed in the Introduction, the inventors disclose a grow light system that can produce an adjustable combined emission spectrum, as is useful to growing plants of different types, or as is useful to adjusting the spectrum provided to a given plant as it grows. In some examples, the grow light can also include a sensor system to (among other details) detect the height of plants it is illuminating, and can via an elevator adjust the height of the grow light to maintain an optimal distance between the plants and the grow light. The grow light system preferably includes a computer device with a Graphical User Interface (GUI) useable to adjust the height of the grow light or to set a plant-to-grow light distance, and to select a combined emission spectrum for the grow light, which may occur by selecting a particular plant type, plant variety, or group of plants in the GUI. Control of the grow light system can be automated, with the computing device including a library of optimal settings to configure the system to optimally grow each selected plant type, variety, or group. The computer device can also be used to control multiple grow lights in a grow farm setting.

Figure 1:
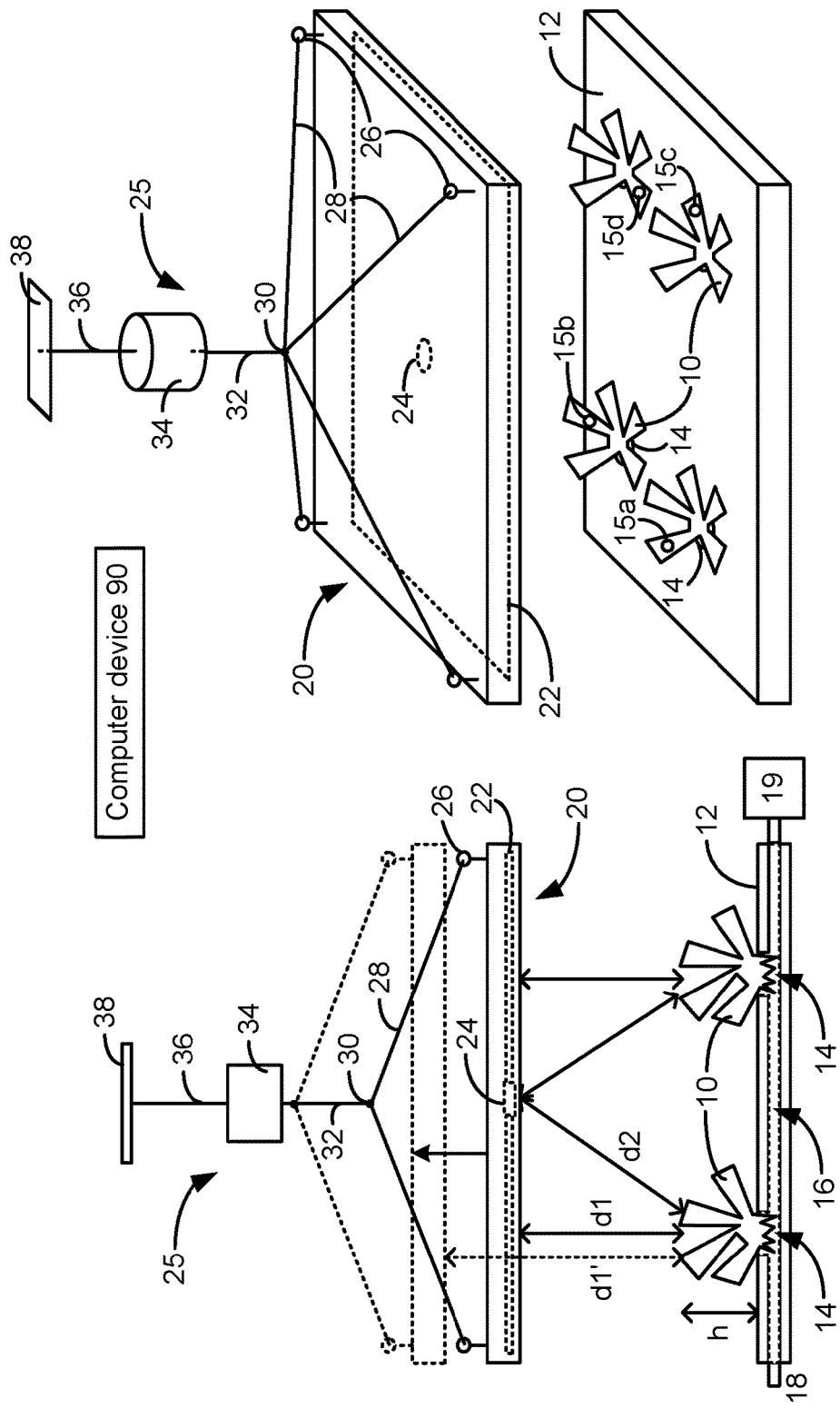
FIG. 1 shows an example of a grow light system including a grow light, an elevator system for adjusting the height of the grow light over the plants, and a computer device for providing system control.

FIG. 1 shows an example of an improved grow light system in cross-sectional and perspective views. The system includes at least one grow light 20, whose construction is explained later with reference to FIG. 2. The grow light system in this example further includes a hydroponics tray 12 for growing plants 10, an elevator system 25 to raise and lower the grow light 20 relative to the plants 10, and a computer device 90 preferably in communication with at least the grow light 20 and the elevator system 25.

The hydroponics tray 12 can comprise any sort of hydroponics system used to grow plants (e.g., wick systems, deep water culture systems, nutrient film technique system, ebb and flow (or flood and drain) systems, aeroponics systems, drip systems, etc.), and in this example includes openings 14 where seeds or seedlings can be planted. In the example shown, water and nutrients for the plants are provided by channels 16, which can be pumped in or out of the tray 12 at openings 18, and as controlled by an irrigation system 19. Although only a single grow light 20 and hydroponics tray 12 are shown in FIG. 1, it should be understood that many such lights and trays can be used to create a larger growing area, as is typical in a grow farm setting. Note that hydroponics trays 12 are not required in the disclosed grow light system. For example, although not shown, plants in pots could also be placed under the grow lights 20 perhaps with a suitable irrigation system, or the grow lights 20 can be placed directly over soil in which the plants 10 are growing. The computer device 90 may also communicate with and control the irrigation system 19, as discussed further below.

The elevator system 25 can take different form, but in the disclosed example includes a cable hoist 34 which can draw in or let out a main cable 32 to raise or lower the grow light 20 to maintain a distance from the plants 10, or from the hydroponics tray 12 or other growing surface. The main cable 32 connects at junction 30 to the ends of suspension cables 28, whose other ends are connected to screw eyelets 26 affixed to the grow lights 20. Four screw eyelets 26 are preferably connected at the four corners of the grow light 20, although three or more could also be used. The cable hoist 34 is suspended by a stationary cable 36 from a stationary surface 38, such as a room's ceiling, a support beam, etc. The cable hoist 34 contains a motor (not shown) to draw in or let out the main cable 32. A power connection (e.g., plug) for the cable hoist 34 is not shown for convenience.

Further details of the grow light 20 are discussed with reference to FIG. 2, but in FIG. 1 it can be seen that the grow light 20 includes a circuit board 22 and one or more sensor systems 24. Only a single sensor system 24 is shown in FIG. 1 in the middle of the circuit board 22. The sensor assembly 24 may contains a number of different sensors as explained later, but for now note that the sensor system 24 includes a proximity sensor (106, FIG. 6) which is able to detect a distance d between the sensor system 24 (and hence the grow light 20) and the tops of the plants 10 growing under the grow light. This distance d can comprise a shortest vertical distance d1 between the top of the plants and the sensor system 24, or a shortest angled distance d2 from the top of the plants to the sensor system 24. Which distance is used in the system may depend on how many sensor systems 24 are included in the grow light 20 and where such sensor systems are located on the circuit board 22. FIG. 1 shows in dotted lines that the vertical distance of the grow light 20 relative to the tops of the plants 10 has been adjusted from a first vertical distance d1 to a second vertical distance d1' via control of the elevator system 25.

Figure 2:
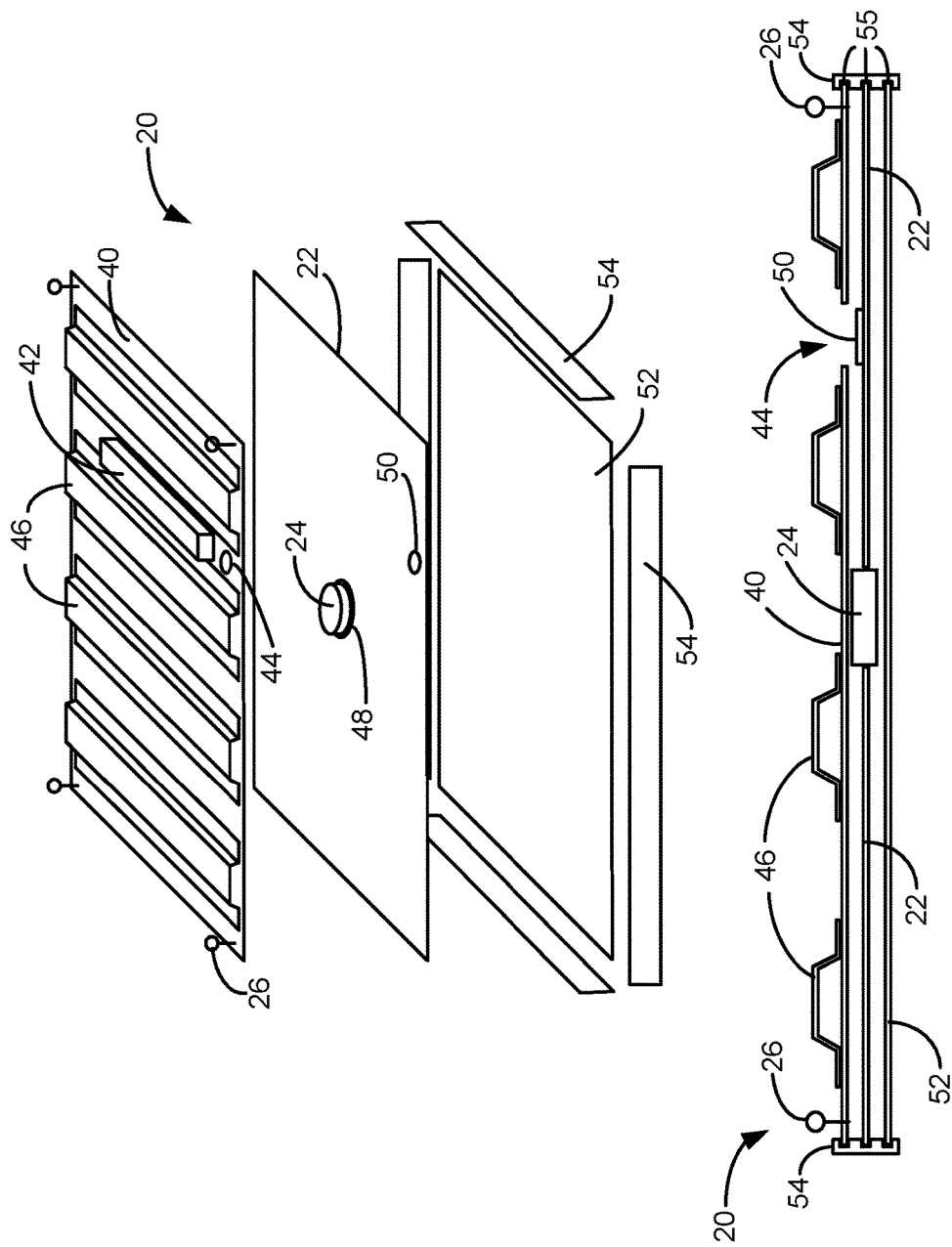
FIG. 2 shows further details of how the grow light can be manufactured.

FIG. 2 shows an example of the manner in which the grow light 20 can be constructed, although other manners of construction can also be used. The grow light 20 includes a top cover 40, preferably made of a metallic material such as sheet metal. The top cover 40 may include a heat sink 46 to help radiate heat from the light emitters 62$i$ appearing on the underside of the circuit board 22, discussed later with reference to FIG. 3. In the example shown, the heat sink 46 comprises raised channels which include passages for airflow, although the heat sink 46 could be constructed in other manners.

The grow light 20 further includes a lighting controller 42, which among other details includes driving circuits 101 (FIG. 6) use to drive currents through the various light emitters 62$i$. A power connection (e.g., plug) for the lighting controller 42 is not shown for convenience. In the example shown, the lighting controller 42 comprises an encapsulated electrical box that is positioned on the top surface of the top cover 40, although the lighting controller 42 could be positioned in any convenient position in or on the grow light 20. An opening 44 can be provided in the top cover to allow signal wires to pass from the lighting controller 42 to the circuit board 22 at a suitable connector 50. The lighting controller 42 may also be remote from the grow light 20, which cabling from the remote light controller 42 connecting to the connector 50. Note that the screw eyelets 26 can be connected to the top cover 40 as shown, or to the side frames 54 discussed further below.

The sensor system 24 is also shown in FIG. 2, and as before only a single sensor system 24 is shown which is placed in a hole 48 in the center of the circuit board 22 and fastened (e.g., screwed) into place. More than one sensor system 24 can be used, and the sensor system need not pass through a hole in the circuit board 22. For example, the sensor system 24 could be mounted to the underside of the circuit board 22 to face the growing plants underneath.

Optionally, a diffuser 52 may be included in the grow light 20 between the underside of the circuit board 22 and the growing plants. The diffuser 52 operates to scatter light produced by the light emitters 62i to present a combined emission spectrum to the growing plants that is more spatially homogenous. Preferably, the diffuser 52 is transparent to useful wavelengths produced by the light emitters 62i, and is typically made of various glass or plastic materials.

Construction of the grow light 20 can include a frame 54 which may comprise four separate panels as shown. Edges of the top cover 40, the circuit board 22, and the diffuser 52 can meet with slots 55 or other holding mechanisms in the frame 54, as best seen in the cross section at the bottom of FIG. 2. After the frame panels 54 are positioned around the top cover 40, the circuit board 22, and the diffuser 52, they can be connected (e.g., screwed) together using flanges or brackets (not shown), thus holding the top cover 40, the circuit board 22, and the diffuser 52 securely in place. In one example, the grow light may be four-by-four feet in area, but could be made of any size.

While the grow light 20 is disclosed as comprising a single circuit board 22, this is not strictly necessary. For example, the grow light can include a plurality of different heads or regions, each having its own circuit boards and light emitters 62i. Such heads may be adjustable to point in different directions. The one or more circuit boards 22 used in the grow light 20 may be square, circular, triangular, or of any desired shape.

Figure 3:
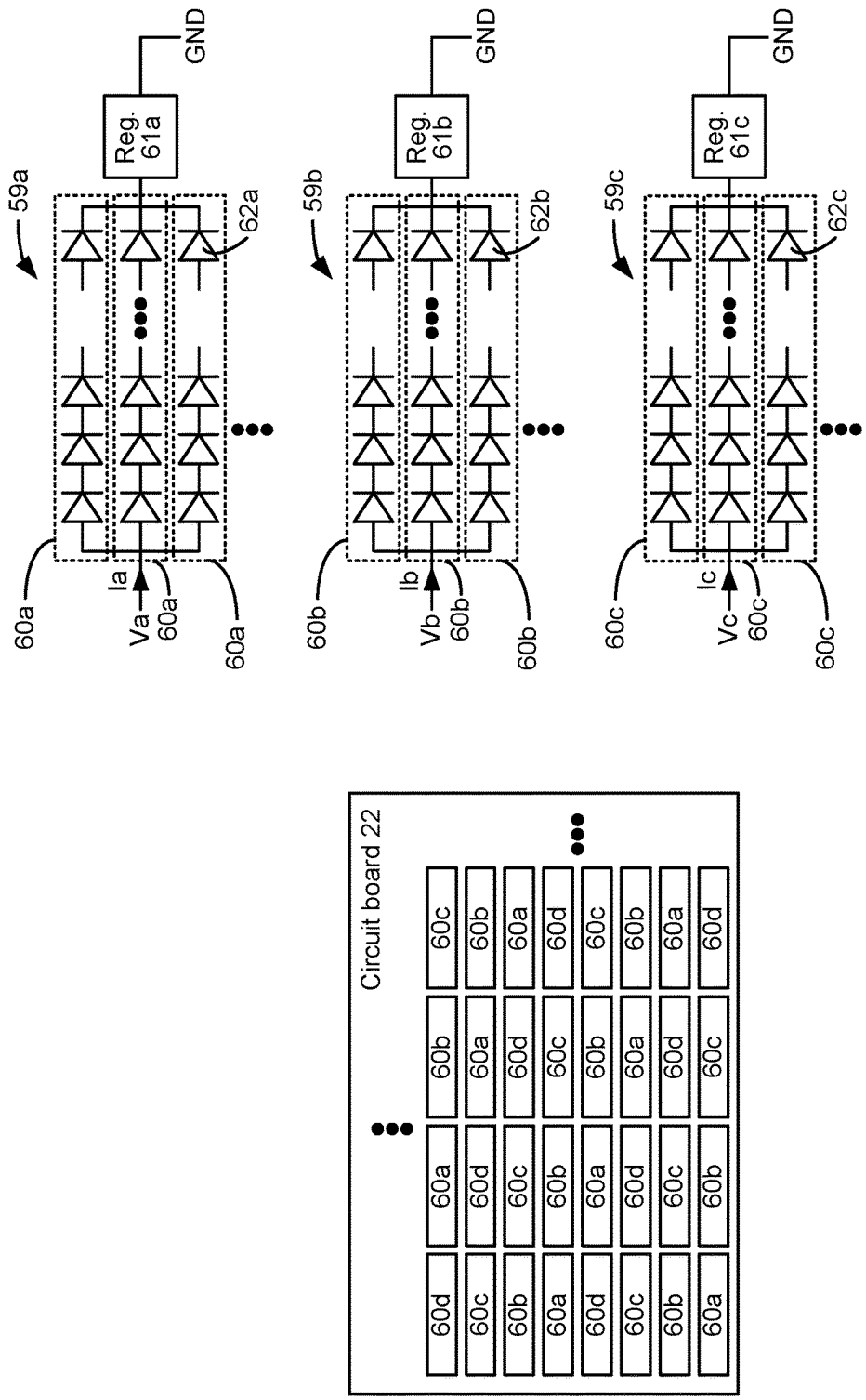
FIG. 3 shows the circuit board of the grow light, and the use of different types of light emitters each producing individual emission spectra to in sum create a combined emission spectrum.

FIG. 3 shows various light emitting regions 60i usable in the grow light, and in particular shows a manner in which these regions can be randomly positioned on the underside of the circuit board 22 that faces the growing plants. Each light emitting region 60i includes one or more light emitters 62i each having a unique emission spectrum, such that light emitted from the regions 60i can be mixed in different proportions to produce a combined emission spectrum that is presented to the growing plants. For example, light emitters 62a may have an emission spectrum in which red wavelengths predominate; light emitter 62b may have an emission spectrum in which green wavelengths predominate, etc. Example emission spectra for the light emitters 62i and their combination to form a combined emission spectrum are explained later with respect to FIGS. 4-5B. Each light emitter 62i may comprise an LED chip having one or more LEDs explained later. However, other types of light emitters (bulbs, lasers, etc.) could be used as well. Four light emitting regions 60a, 60b, 60c, and 60d respectively having unique light emitters 62a, 62b, 62c, and 62d are shown in FIG. 3, but less or more could also be used.

In the example shown, each of the light emitting regions 60i contains one or more light emitters 62i connected in series. However, this is not strictly necessary, and instead each light emitting region 60i can include light emitters 62i connected in parallel, or connected in series and parallel combinations.

FIG. 3 shows that the locations of the light emitting regions 60i can be randomized on the circuit board 22 so that the combined emission spectrum produced will be more spatially homogenous. For example, the bottom row includes a light emitting region 60a followed by 60b, 60c, 60d, and this may repeat (60a, 60b, 60c, 60d). The next row up includes a light emitting regions 60b, 60c, 60d, 60a, and so on. Other manners of randomizing or otherwise spatially distributing the light emitting regions 60i may be used as well.

Figure 6:
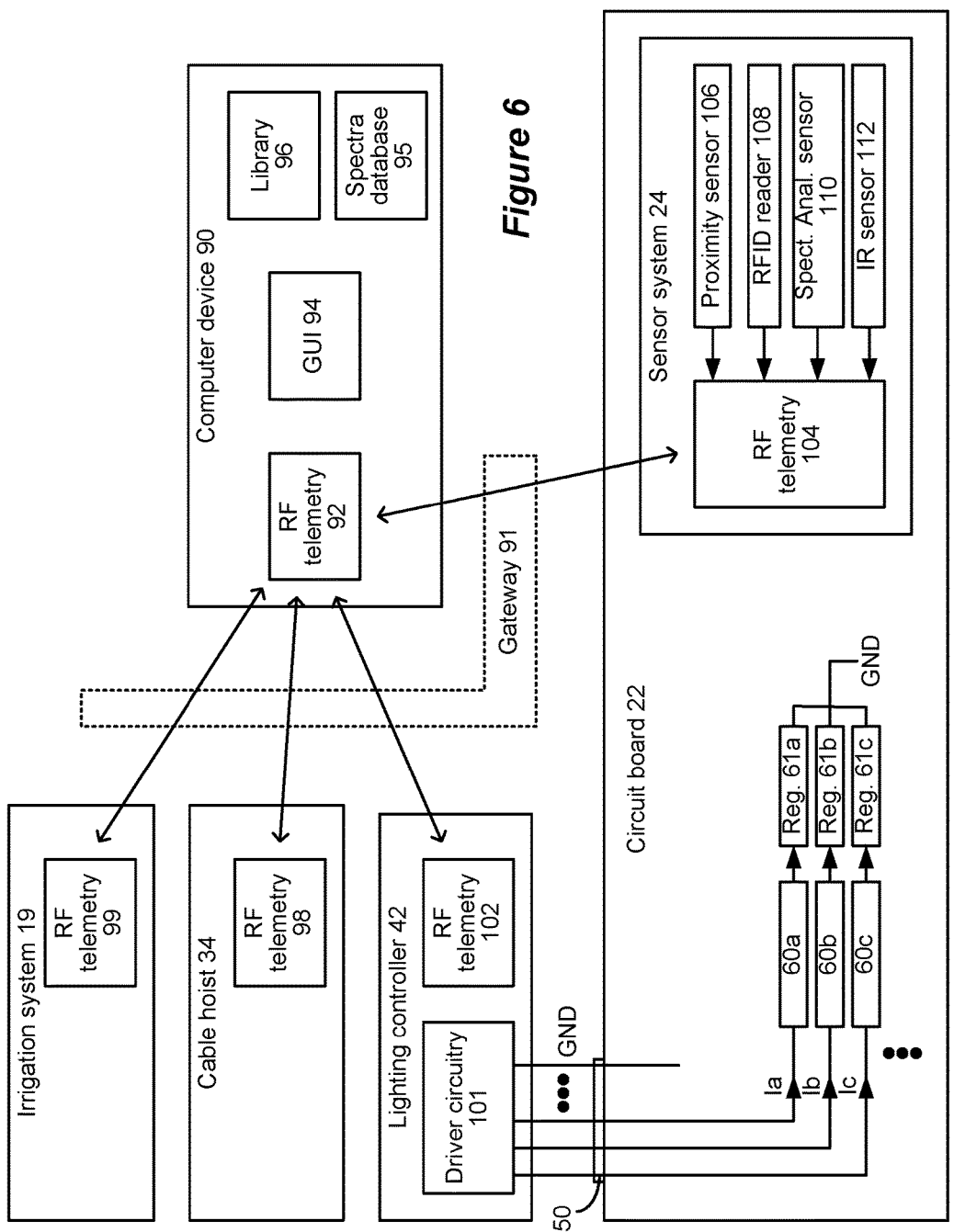
FIG. 6 shows a block diagram of the grow light system, with focus on the manners in which the various components can communicate, and in particular shows a sensor system useful to allow for system control and monitoring.

Preferably, each of the light emitting regions 60i are grouped 59i, with the light emitting regions 60i in each group being driven in parallel with a unique drive current Ii. Each of the drive currents are preferably adjustable to adjust the combined emission spectrum of the grow light 20, as explained later. Thus, group 59a is driven with drive current Ia; group 59b is driven with drive current Ib, and so on. Driving the light emitting regions 60i in parallel isn't strictly necessary, but is preferred as it reduces the number of currents Ii that must be provided by the driver circuitry 101 in the lighting controller 42 (FIG. 6). Nonetheless, each individual light emitting region 60i, or less than all light emitting regions 60i, could be driven by their own currents in different examples. Currents Ii may be constant current or pulsed currents with a particular duty cycle. Each current Ii is sustained by a compliance voltage Vi produced by the driver circuitry 101, which voltages take into account the effective resistances of all of the light emitting regions 60i being driven. If necessary, currents Ii through the light emitting regions 60i can be regulated by one or more regulator circuits 61i.

Figure 4:
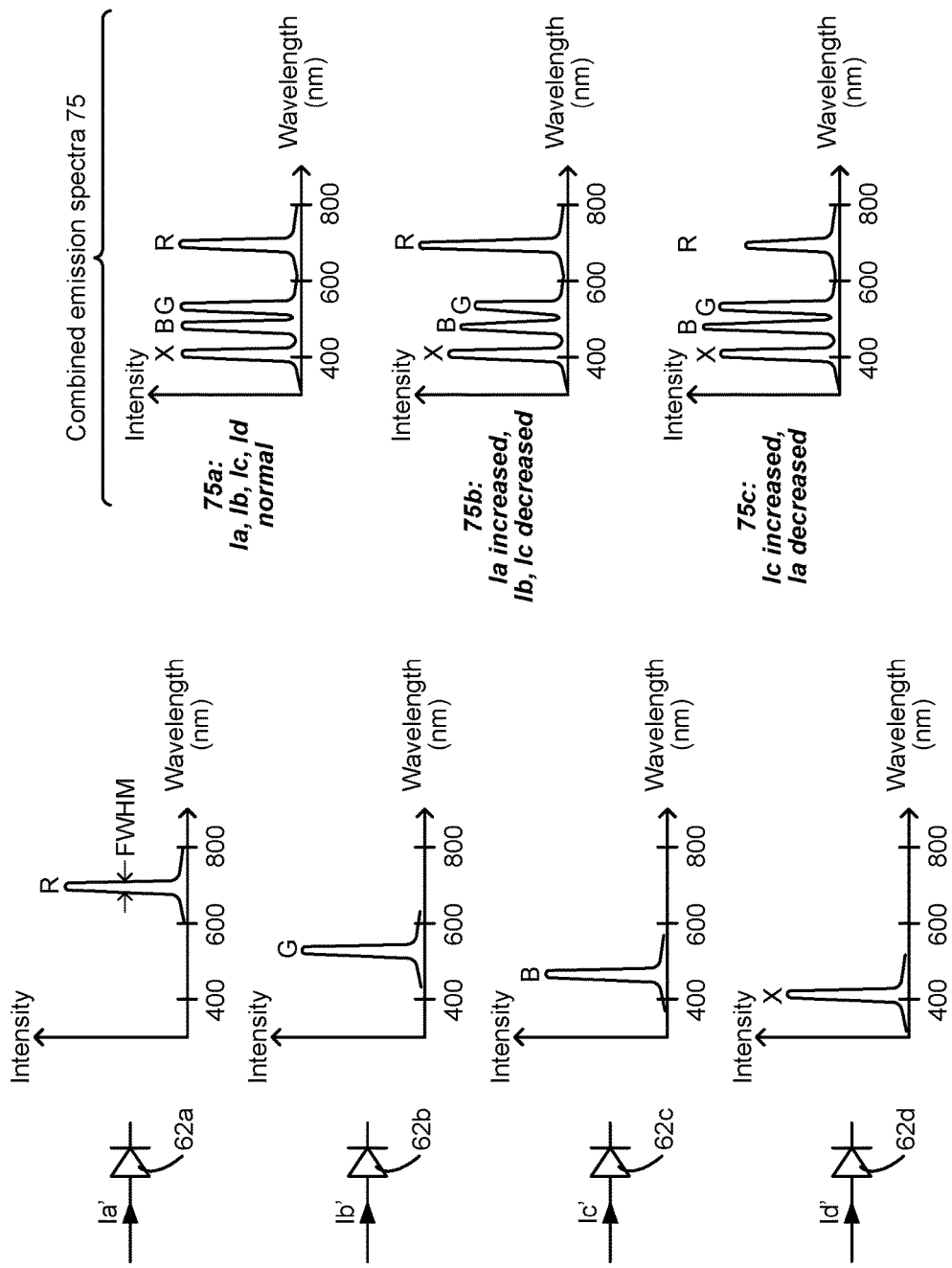
FIG. 4 shows examples in which the different light emitters are narrow-band Light Emitting Diodes (LEDs), and shows adjustment to the individual emission spectra via adjustment of the drive currents to the LEDs to create an adjustable combined emission spectrum.

As already noted, each of the light emitting regions 60i comprises one or more light emitters 62i, and examples of different light emitters 62i are shown in FIGS. 4-5B. The light emitters 62i in the example of FIG. 4 comprise narrow-band LEDs having sharp emission spectra at particular wavelengths. For example, light emitter 62a comprises a red LED having a sharp emission peak at around 700 nm; light emitter 62b comprises a green LED having a sharp emission peak at around 520 nm; and light emitter 62c comprises a blue LED having a sharp emission peak at around 450 nm.

Light emitter 62d comprises an optional LED having a sharp emission peak at approximately 405 nm (e.g., from 402 to 408 nm). Light at this wavelength is deep purple and barely visible as it is close to UltraViolet (UV) wavelengths (typically 400 nm or less). As explained in U.S. Patent Publication 2017/0014538, emission at this wavelength has antimicrobial properties that is disruptive to microbial growth (e.g., bacteria, fungi, and viruses). Inclusion of light emitters 62d can be especially useful in a grow light application, as it will reduce or eliminate microbes that might harm the growing plants. Each of the peaks in these narrow-band spectra may have a Full Width Half Maximum (FWHM) of 50 nm or less.

Each of the individual light emitters 62a-62d as shown in FIG. 4 are driven with a current Ia'-Id', which currents will scale with the currents Ia-Id used to drive the light emitting regions 60i. Such scaling will depend on the number of light emitting regions 60i driven by current Ii, and manner in which the light emitters 62i are connected in each light emitting region 60i. For example, if twenty light emitting regions 60a are driven in parallel with current Ia (FIG. 3), with each region including a series connection of one or more light emitters 62a, then current Ia' through any one light emitter 62a will equal Ia/20.

Each of the currents Ia-Id (or 1a'-1d') are individually controlled in the grow light 20 to produce a combined emission spectrum 75, as shown in FIG. 4. Combined emission spectrum 75a results when Ia-Id are driven at what can be considered generally normal values, with red (R), green (G), and blue (B) peaks in the combined emission spectrum 75 balanced to create a generally white light. This is beneficial, as the grow lights 20 preferably work to provide general illumination as well as to provide emission spectra that are beneficial for growing different types of plants. Combined emission spectrum 75a might be optimal for growing a first type of plant, or optimal for growing a given plant during a first growth phase.

In combined emission spectrum 75b, Ia is increased and Ib and Ic are decreased from their normal values. This still produces significant red, green, and blue components (and which still generally produces white light), but with a higher intensity in the red portion of the spectrum, and lower intensities in the green and blue portions of the spectrum. Combined emission spectrum 75b might be optimal for growing a second type of plant, or optimal for growing a given plant during a second growth phase. In combined emission spectrum 75c, Ia is decreased and Ic is increased from their normal values. This again generally produces white light, but with a lower intensity in the red portion of the spectrum, and a higher intensity in the blue portion of the spectrum. Combined emission spectrum 75c might be optimal for growing a third type of plant, or optimal for growing a given plant during a third growth phase.

In each of the combined emission spectra 75i in FIG. 4, current Id produces a peak (X) at 405 nm, which as noted earlier provides antimicrobial properties to the spectra, and which does not significantly contribute to white light generation. Current Id can also be varied to adjust the amount of disinfection provided to the growing plants.

Figure 5A:
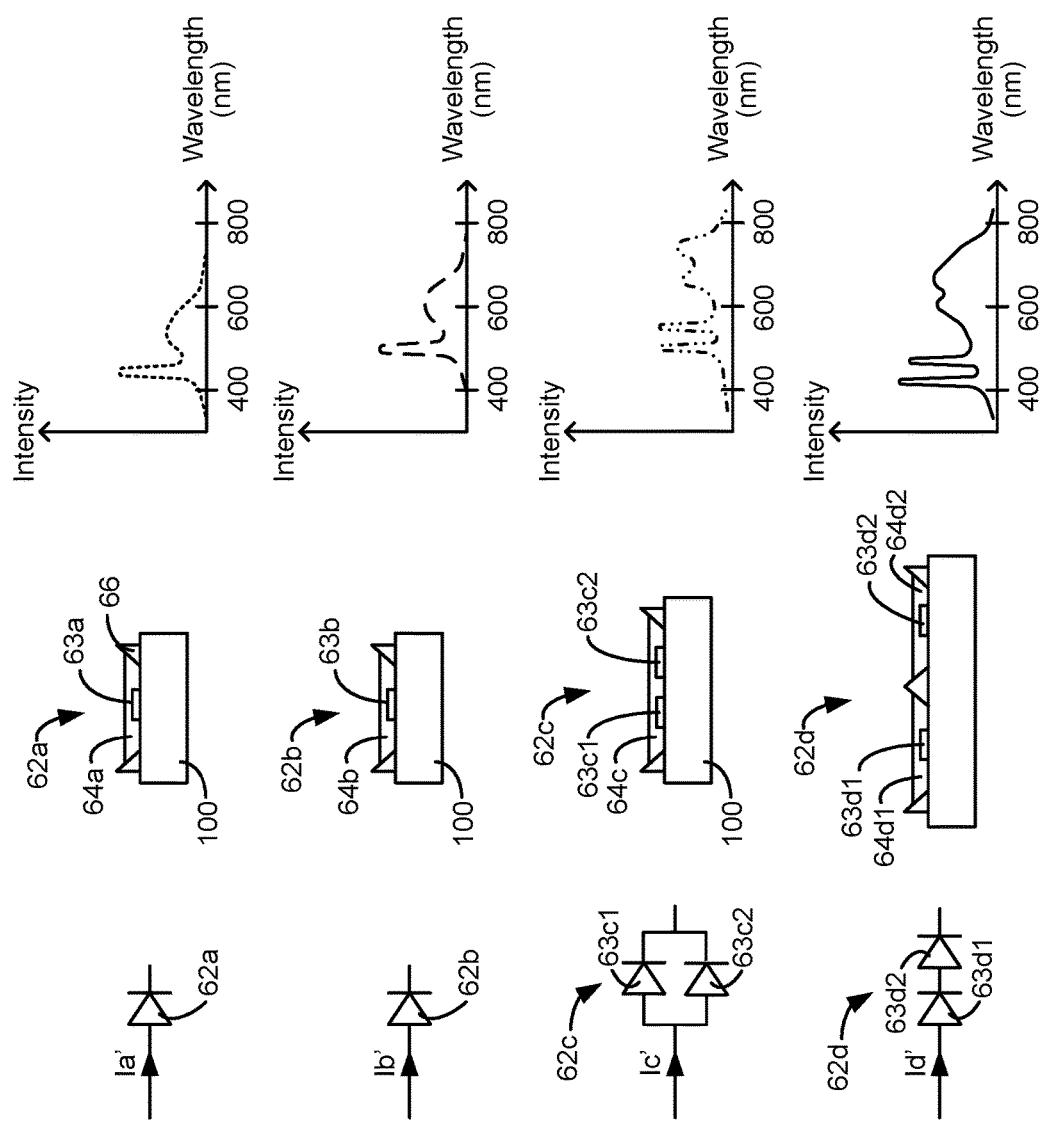

The light emitters 62i useable in the grow light 20 do not need to be narrow-band emitters, but can instead be broad-band emitters that produce a wider emission spectrum, as shown in FIGS. 5A-5B. Broad-band emitters 62i can be achieved by using one or more LEDs in conjunction with one or more wavelength conversion materials or phosphor layers (hereinafter, "phosphors"). For example, broad-band light emitter 62a, as shown in cross section in the form of an LED chip, includes an LED 63a with a narrow-band peak at about 450 nm. Included on top of the LED 63a is a phosphor layer 64a with may comprise one or more phosphor materials designed to absorb some of the emission at 450 nm, and to produce secondary emissions at longer wavelengths (lower energy). See, e.g., U.S. Patent Application Publication 2013/0194795, which is incorporated by reference in its entirety, discussing different types of phosphor layers and their constituent materials. A reflector 66 can be included to keep the emission from light emitter 62a optically confined to its LED chip, which chip is built on a substrate 100. As shown in the emission spectrum for light emitter 62a, secondary emission peaks at about 530 nm, but is broad-band (with a FWHM of greater than 50 nm). It is possible, depending on the phosphors materials in the phosphor layer 64a, that more than one secondary peak could be present. Some amount of the primary radiation from LED 63a is unabsorbed and thus breaks through the phosphor 64a, and thus a narrow-band peak at 450 nm is also produced in the emission spectrum. In general, the emission spectrum for light emitter 62a can be characterized as having a mix of wavelengths but with a predominance of frequencies in the blue range of the visible spectrum. One skilled in the art will recognize that the emission spectrum for light emitter 62a can be tailored by choosing one or more LEDs 63a emitting at desired wavelengths and by choosing one or more phosphor materials and their relative proportions.

Broad-band light emitter 62b is similar to 62a, but produces a broad-band emission spectrum with a predominance of frequencies in the green range of the visible spectrum. Light emitter 62b includes an LED 63b with a narrow-band peak at about 500 nm, and a phosphor layer 64b with a broad-band secondary emission peak at about 600 nm. Again, proper choice of the LED 63b and phosphor materials in the phosphor layer 64b can produce the desired spectrum.

Broad-band light emitters 62c and 62d show examples using more than one LED in a LED chip. In these examples, two LEDs are used, but more than two could also be used. In light emitter 62c, LEDs 63c1 and 63c2 are driven in parallel by current Ic', with each having their own unique narrow-band emission peaks at about 500 nm and 550 nm respectively. A phosphor layer 64c covers both LEDs, with the result that light emitter's emission spectrum has two broad band peaks at 670 nm and 740 nm. Although not shown, different phosphor layers could cover each of the LEDs 63c1 and 63c2, similar to what occurs in light emitter 62d discussed next. In sum, the emission spectrum for light emitter 62c can be characterized as having a mix of wavelengths but with a predominance of frequencies in the red range of the visible spectrum.

In light emitter 62d, the two LEDs 63d1 and 63d2 are driven by current Id' in series. Each is covered by a unique phosphor layer 64d1 and 64d2, but a single phosphor layer could cover both. In this example, light emitter 62d adds anitmicrobial functionality to the grow light, because LED 63d1 provides a narrow band emission at 405 nm which as noted above provides antimicrobial functionality. LED 64d2 provides a narrow band emission at 470 nm. Phosphor layer 64d1 over LED 63d1 produces a broad-band secondary peak at about 600 nm while phosphor layer 64d2 over LED 63d2 produces a broad-band secondary peak at about 670 nm. In sum, the emission spectra of light emitter 62d produces an overall good mix of wavelengths to produce white light in its emission spectrum, as is useful to provide general illumination from the grow light 20, and further includes the narrow-band break-through at 405 nm adding antimicrobial functionality.

Other types of broad-band light emitters 62i could be designed and used in grow light 20 as well, such as those disclosed in U.S. Patent Application Publication US 2017/0014538 and U.S. Pat. No. 9,681,515, which are incorporated herein by reference in their entireties.

FIG. 5B shows how emission spectra from the broad-band light emitters 62i of FIG. 5A can be adjusted and mixed to produce desired combined emission spectra 85i as might be useful to growing different types of plants, or as might be beneficial to growing a single plant during different growth phases. For simplicity and for easier comparison to FIG. 5A, the combined emission spectra 85i are shown as comprising the individual emission spectra for light emitters 62i overlaid on top of each other, but one skilled in the art will understand that these individual emission spectra would be summed in the combined emission spectra 85i.

In all of combined emissions spectra 85a-c, it is assumed that current Id for light emitter 62d is set to a normal value, which again provides a white light and antimicrobial functionality to the combined emission spectra. Id could however be varied to vary the combined emission spectra as well. It is further assumed for simplicity in combined emission spectra 85a-c that certain currents (i.e., certain light emitters 62i) are inactive. For example, in combined emission spectrum 85a, currents Ia and Ib are assumed to be zero (or low), and thus light emitters 62a (with a predominance of blue wavelengths) and 62b (with a predominance of gren wavelengths) do not provide a significant contribution to combined emission spectrum 85a. As a result, combined emission spectrum 85a includes a predominance of red light from light emitter 62c (Ic), plus a general white light and antimicrobial functionality from light emitter 62d (Id). Of course, light emitters 62a and/or 62b could also contribute more significantly to combined emission spectrum 85a by increasing Ia and/or Ib, although again this isn't shown for simplicity.

In combined emission spectrum 85b, currents Ia and Ic are assumed to be zero (or low), and thus light emitters 62a (with a predominance of blue wavelengths) and 62c (with a predominance of red wavelengths) do not provide a significant contribution to combined emission spectrum 85b. As a result, combined emission spectrum 85a includes a predominance of green light from light emitter 62b (Id), plus a general white light and antimicrobial functionality from light emitter 62d (Id). Again, light emitters 62a and/or 62c could also contribute more significantly to combined emission spectrum 85b.

In combined emission spectrum 85c, currents Ib and Ic are assumed to be zero (or low), and thus light emitters 62b (with a predominance of green wavelengths) and 62c (with a predominance of red wavelengths) do not provide a significant contribution to combined emission spectrum 85c. As a result, combined emission spectrum 85a includes a predominance of blue light from light emitter 62a (Ia), plus a general white light and antimicrobial functionality from light emitter 62d (Id).

To summarize, the grow light 20 preferably includes a number of different types of light emitters 62i with different individual emission spectra. The light emitters 62i can be narrow- or broad-band, or a combination of both. By adjusting the drive current to each of the different types of light emitters 62i, a combined emission spectrum can be produced by the grow light that is optimal for different types of plants, or for different growing phases of the same plant.

FIG. 6 shows a block diagram of the grow light system. The computer device 90 as shown includes a GUI 94 renderable on a display screen, and a library database 96 of grow light system settings, as described further later. Computer device 90 may comprise a general purpose computing device 90, such as a personal computer, tablet, notebook, smart phone, a personal data assistant, and the like. Computer device 90 may also comprise a proprietary device specifically designed for use with the grow light system. For example, computer device 90 may comprise a handheld controller dedicated for use with the grow light system.

The computer system 90 preferably includes an RF telemetry circuitry block 92, including the necessary chip sets and antenna to wirelessly communicate with other components in the system. In a preferred example, the RF telemetry circuitry block 92 communicates using a Bluetooth communications protocol, although RF telemetry circuitry block 92 may also support different types of wireless protocols, such as Zigbee, WiFi, or other proprietary protocols. Preferably, the computer device 90 communicates with the cable hoist 34, the lighting controller 42, the sensor system 24, and the irrigation system 19, which may have their own RF telemetry circuitry blocks 98, 102, 104, and 99 respectively. While wireless communication is preferred within the system, certain or all communication pathways may also occur via wired means.

The computer device 90 can via the communication links just discussed control the cable hoist 34, and in particular can control the height of the grow light 20 relative to the tops of the plants growing underneath, or another reference point such as ground or the top surface of the hydroponics tray 12 (FIG. 1). The computer device 90 can also control the lighting controller 42, and in particular can program driver circuitry 101 in the lighting controller 42 to produce drive current currents Ii for the light emitting regions 60i (and thus scaled currents Ii' for the light emitters 62i in those regions).

One skilled in the art will understand that the LED driver circuitry 101 includes one or more programmable current sources to produce the necessary drive currents for each of the light emitting regions 60i.

The computer device 90 is assisted by one or more sensor systems 24, each of which may include one or more sensors, not all of which are necessary in the system. All sensors in the sensor system 24 may be integrated within a single housing, but this is not strictly necessary. Instead, each of the sensors in a sensor system 24 may comprise stand-alone components.

As shown, the sensor system 24 includes a proximity sensor 106, and RFID reader 108, a spectral analysis sensor 110, and an Infra-Red sensor 112. The proximity sensor 106 is designed to determine the distance to the growing plants or other reference point. Preferably, the proximity sensor 106 emits an electromagnetic field or a beam of electromagnetic radiation (infrared, for instance), and looks for changes in the field or return signal as reflected off the tops of the plants 10. From this return signal, the proximity sensor 106 is able to determine the distance between the proximity sensor 106 and the tops of the plants. Such distance data may be measured periodically (e.g., every hour) and transmitted via RF telemetry to the computer device 90.

As will be discussed in more detail later, the computer device 90 is preferably programmed to maintain an optimal distance d that the grow light 20 should be from the tops of the plants 10. If the distance measured by the proximity sensor 106 is different from this optimal distance d, the computer device 90 will transmit via RF telemetry instructions for the cable hoist 34 to raise or lower the grow light 20. For example, if the optimal distance d programmed in the computer device is 20 inches, but the distance measured by the proximity sensor 106 is 19 inches (e.g., because the plants have grown an inch), the computer device 90 will instruct the cable hoist 34 to raise the grow light by one inch, e.g., by drawing its main cable 32 (FIG. 1) in by one inch. Thus, as periodic measurements are taken by the proximity sensor 106, the computer device 90 can instruct the cable hoist 34 to raise or lower the grow light to maintain the optimal distance d that is appropriate at that point in time during the plant's growth cycle. As discussed further below, this optimal distance d may not be constant over the growth cycle of the plants.

Sensor system 24 also preferably includes a security sensor, such as RFID reader 108. This is useful for security purposes and to track the position and location of the plants that are being grown. In this regard, each of the plants 10 growing under the grow light 20 may have RFID tags 15i affixed to them, as shown in FIG. 1. The RFID reader 108 can thus detect via RFID tags 15a-d if a plant 10 have been moved from under the grow light 20, and can communicate such movement to the computer device 90. This is useful to prevent theft of the plants 10, which is especially useful if the plants are subject to regulation because of their sensitive nature, such as *cannabis* plants.

Sensor system 24 may also include a spectral analysis sensor 110 to analyze the combined emission spectrum emanating from the grow light 20. This is useful because the emission spectra output by the various light emitters 62i in the grow light 20 may change over time as they wear, or otherwise because some of the light emitters 62i may cease to function. The spectral analysis sensor 110 is preferably able to determine the intensity of all wavelengths of interest in the combined emission spectra the grow light is producing, and to transmit that measured spectrum to the computer device 20. The computer device 20 in turn can determine whether the combined emission spectrum measured by the spectral analysis sensor 110 matches the combined emission spectrum that the computer device is programming the grow light 20 to produce. It is not strictly necessary to measure the combined emission spectrum at all wavelengths, and instead the spectral analysis sensor 110 may sense the intensity of the combined emission spectrum only at certain wavelengths, such as at red (R), green (G) and blue (B) wavelengths, and transmit the intensity of those wavelengths to the computer device 20 as representative of the produced combined emission spectrum. In one example, spectral analysis sensor 110 may comprise an RGB sensor, such as is provided by sensor part number SU-4S-LRW product produced by Enlighted, Inc.

Sensor system 24 may further include an Infra-Red (IR) sensor 112. This can be useful to measuring the temperature of the growing plants and reporting such temperatures to the computer device 90. Such temperature data may be important to review at the computer device, because temperature may indicate whether the plants 10 are being properly ventilated and watered. In this regard, the grow light system can include an environmental control system (e.g., fans, heaters, air conditioning, etc.) to control temperature, ventilation, and humidity of the environment in which the plants are growing. Such an environmental control system can also be controlled by the computer device 90, also this isn't shown in the figures. In any event, the IR sensor 112 can report temperature data to the computer device 90, which can control the environmental control system, or which can simply present the reported temperature to a user of the computer device 90. If the temperature is too high or too low, the computer device 90 can also indicate a warning or alarm, as discussed further below.

The grow light system can be configured different from the manner illustrated in FIG. 6. For example, the computer device 90 need not be in direct communication with other components of the system by Bluetooth for example. Instead, components such as the cable hoist 34, lighting controller 42, the sensor system 24, and the irrigation system 19 may communicate with the computer device 90 via one or more communication gateways 91, as shown in dotted lines in FIG. 6. Such gateways 91 may include an Internet server, thus allowing the computer device 90 to communicate with system components via the Internet or another network, and thus allowing computer device 90 to be remote from one or more grow lights that it controls and monitors. Other aspects of the system may be integrated or divided. For example, suitable cabling may allow the cable hoist 34, lighting controller 42 and the sensor system 24 to share a single RF telemetry circuitry block to communicate with the computer device 90. The computer device 90 may also be integrated with and comprise a panel on the grow light 20 for example.

Figure 7:
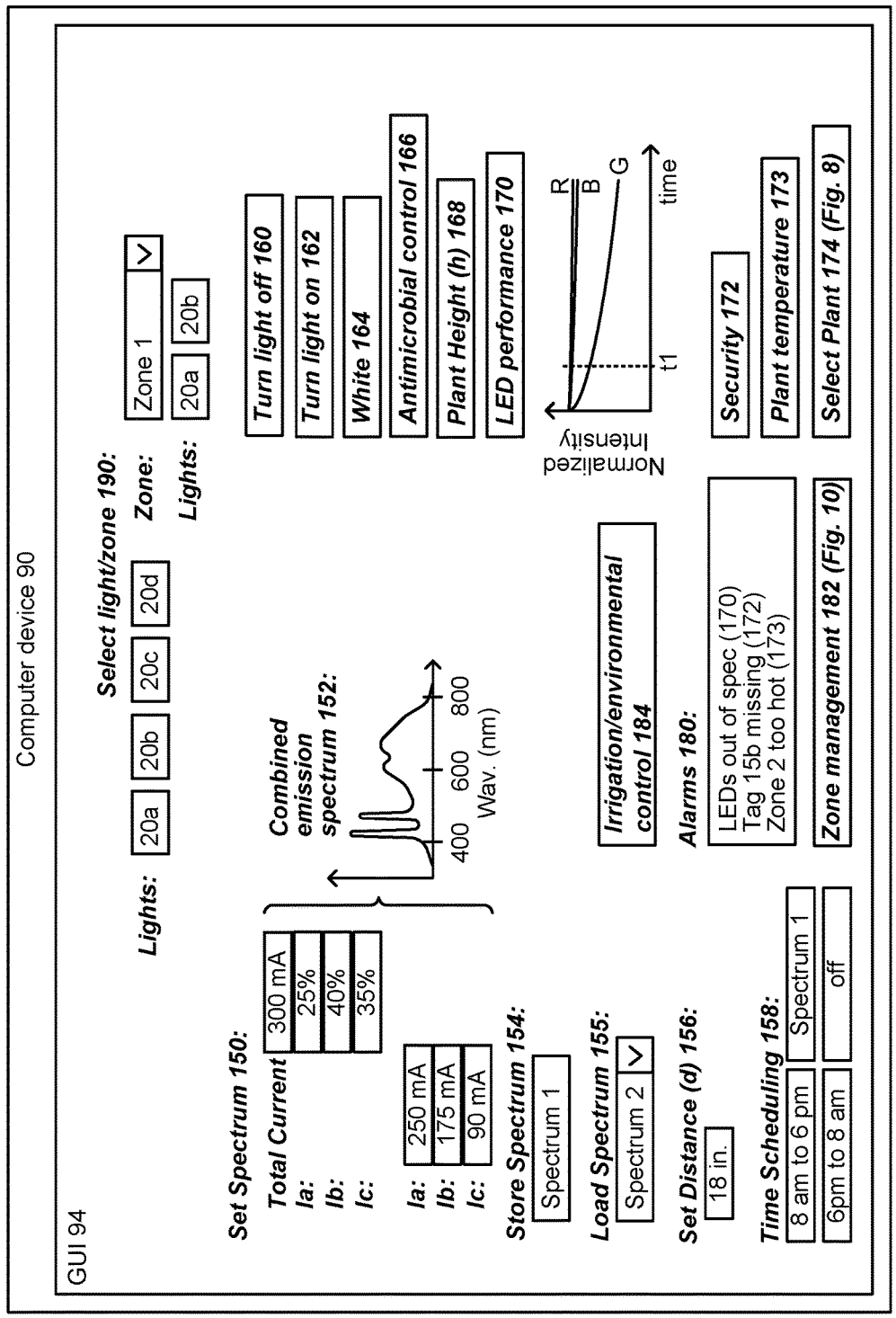
FIG. 7 shows an example of a Graphical User Interface (GUI) of the computer device of the system, and shows various aspects by which a user can control and monitor operation of the grow light system.
Figure 8:
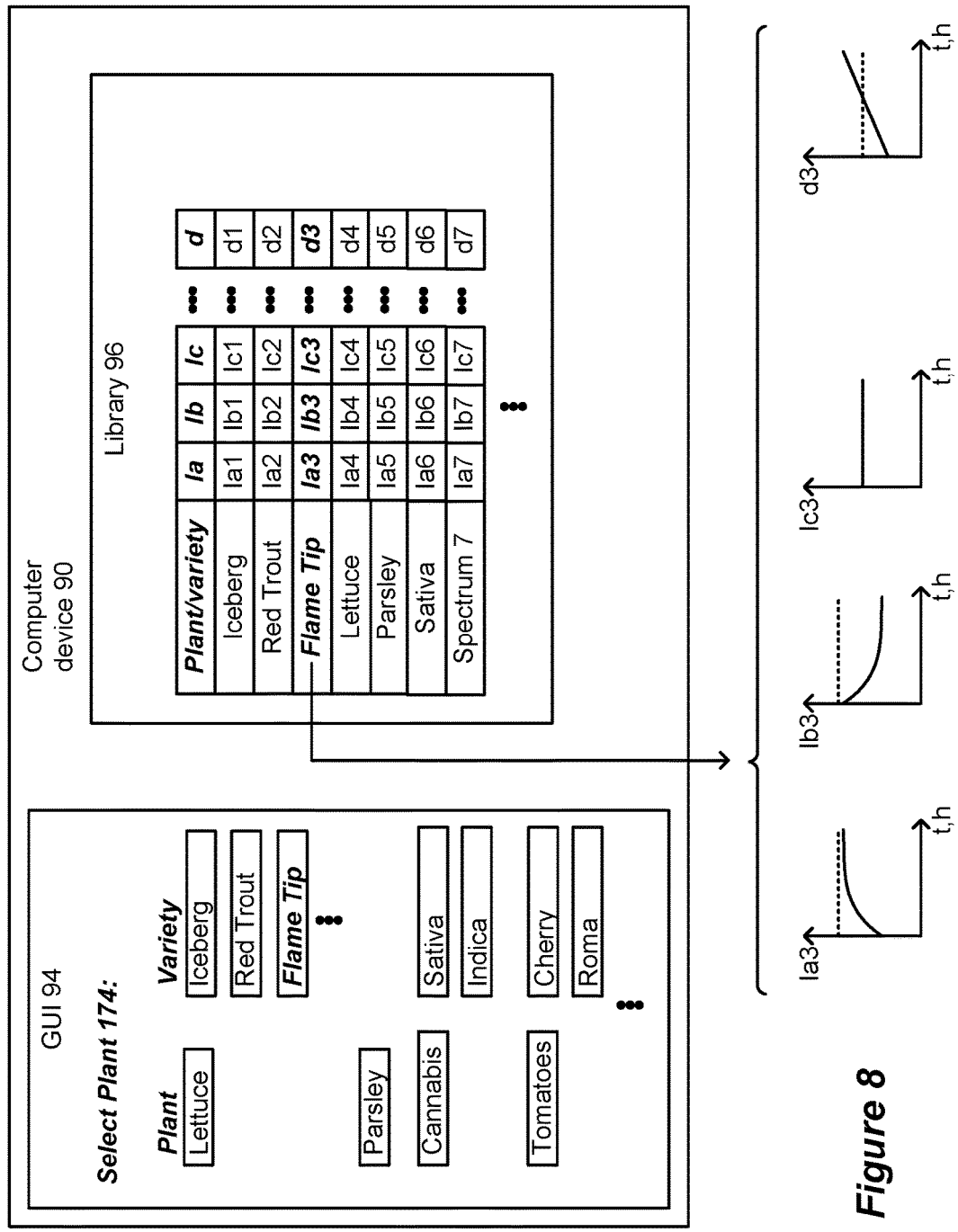
FIG. 8 shows a portion of the GUI allowing a user to select a type, variety, or group of plants, and explains how optimal settings for each type, variety, or group can be stored in the computer device and used to automatically configure the grow light system to optimally grow such types, varieties, and groups.
Figure 10:
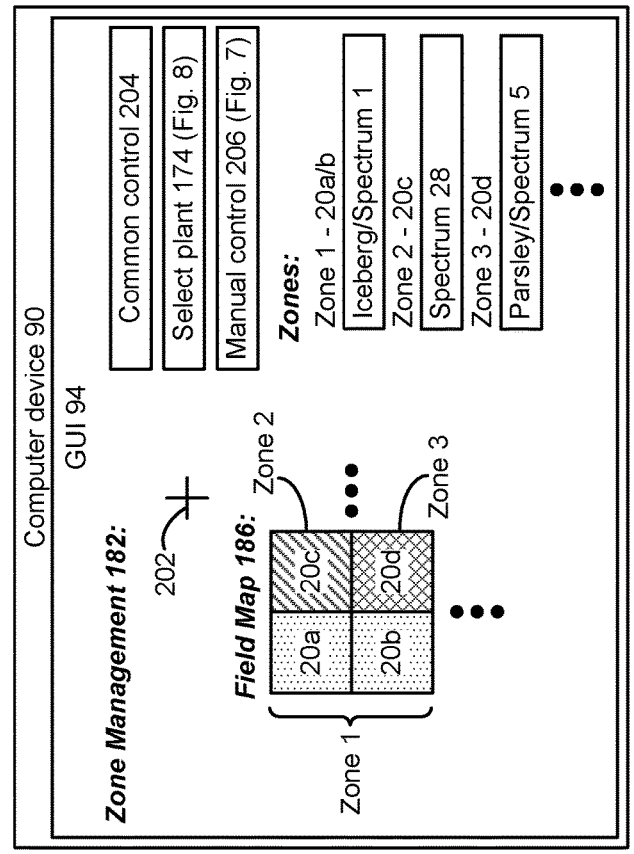
FIG. 10 shows a portion of the GUI allowing a user to define one or more of the grow lights in a grow farm within a zone, thus allowing the computer device to provide common control for that zone.

FIG. 7 shows an example of the GUI 94 of the computer device 90 and how it can be used to control one or more grow lights 20 and to monitor other aspects of the system. It should be understood that the GUI 94 in an actual implementation may be more complicated, and may present different screens to the user, some of which are shown in FIGS. 8 and 10. The GUI 94 includes various aspects, which may comprise inputs allowing a user to control the grow lights and other components in the system, and outputs allowing a user to review system operation.

Aspect 150 of the GUI 94 allows a user to manually set the combined emission spectrum, which occurs as explained above by controlling the various drive currents Ii for the light emitting regions 60$i$ on the circuit board 22 of the grow light 20. These drive currents can be set in different ways. In one example, the user can set a total drive current (e.g., 300 mA) and can specify a percentage of that total current to be used for each drive current (e.g., Ia=25%*300 mA=75 mA). Alternatively, the user can enter each drive current individually (e.g., Ia=250 mA). Only three drive currents are shown in FIG. 7, but there could be more or less depending on the number of light emitting regions 60$i$ present on the circuit board 22. Although not shown, aspect 150 could also include options for producing the entered drive currents as pulsed currents, and thus can allow the user to specify the timing and/or the duty cycle of such pulsed currents.

Once the drive currents have been entered or otherwise automatically determined by the system as discussed further below with reference to FIG. 8, the resulting combined emission spectrum 152 can be shown to the user for review. In this regard, the computer device 90 can store in spectra database 95 (FIG. 6) known individual spectra for each of the individual light emitting regions 60$i$, which again will depend on the types of light emitters 62$i$ used in each. The computer device 90 can then compute and graph the resulting combined emission spectrum 152 by scaling the intensity of each of the individual spectra in accordance with the drive current Ii specified for each, and then summing the scaled individual spectra together.

Once a desired combined emission spectrum 152 has been determined—having optimal wavelengths for a given plant and/or an optimal level of antimicrobial functionality—it can be named (Spectrum 1) and stored (154) in the computer device 90 for future use, with such stored spectrums storing the necessary drive currents Ii needed to produce the spectrum and possibly other grow light settings as well as discussed further below. A stored spectrum can then be retrieved for future use using aspect 155, which may include a drop down menu to allow previously-stored spectra to be reviewed and selected. Specifically, stored spectra can be stored in a library 96, as will be discussed later with respect to FIG. 8. This is particularly useful once optimal drive currents and other settings have been determined for particular types of plants or varieties, and in this regard, stored or loaded spectra may be named to refer to such plants or varieties.

Aspect 156 of the GUI 94 allows the user the set a distance d for the grow light. As discussed earlier, this distance preferably comprises a vertical (d1; FIG. 1) or angled (d2) distance to the top of the plants 10 growing under the grow light 20, but it could also comprise a distance from the ground or top of the tray 12 as well. Once a distance is entered, the proximity sensor 106 (FIG. 6) can be queried to control the cable hoist 34 to adjust the height of the grow light 20, as previously discussed. Distance d can be stored with a determined combined emission spectra (154) and loaded back into the system (155) when that spectra is later retrieved.

Aspect 158 of the GUI 94 allows a user to set a time schedule for operation of the grow light. For example, the user in FIG. 7 has specified that the grow light will illuminate the plants during day-time hours (8 am to 6 pm) with a certain spectrum (Spectrum 1), but will be off during other times. This may be beneficial if certain plants would not benefit from constant illumination, but should instead be illuminated on a more natural schedule. The user could also using aspect 158 specify the use of different spectra at different times, although this isn't shown.

Aspects 160-166 show basic manual controls, allowing for example a user to turn off (160) or resume operation of (162) the grow light. Aspect 164 provides an option to allow the user to choose to have the grow light 20 produce a white light spectrum that is useful for general illumination, but not necessarily optimized for growing plants. Optimal settings for producing white light (i.e., the drive currents to be used for each lighting region 60$i$) may be stored in and retrieved from library database 96, discussed further with respect to FIG. 8. White light aspect 164 may disable generation of antimicrobial functionality by disabling lights emitters 62$d$ (i.e., Id=0).

Aspect 166 allows the user to control antimicrobial functionality of the grow light 20—i.e., to control the drive current Id of light emitting regions 60$d$ having light emitters 62$d$ with significant emissions at 405 nm. Using aspect 166, a user can turn on or off (toggle) such light emitters, or schedule their use. In this regard, it may be useful to provide lower-intensity (or no) 405 nm illumination when people may be proximate to the operating grow light, and higher-intensity 405 nm illumination during other times (e.g., overnight hours). This is because, as explained in U.S. Patent Application Publication 2017/0014538, the deep purple provided by 405 nm radiation may be perceived as harsh by some users.

Aspect 168 allows a user to review the height h of the growing plants. This can be calculated by the computer device 90 as the plant grows, for example by tracking how much the computer device 90 has instructed the cable hoist 34 to raise the grow light 20 over the plants as they grow. Knowing plant height can be useful, because it may be useful to adjust to the combined emission spectrum based upon the height (maturity) of the plants. For example, a given plant might be optimally grown using a first combined emission spectrum when it is lower than 6 inches high, a second when it is between 6 and 12 inches, and a third when it is higher than 12 inches. Aspect 168 may alternatively or when selected provide a graph of the height of the plants as a function of time, although this isn't shown in FIG. 7.

Aspect 170 can provide information to the user about the performance of the light emitters 62$i$ in the light emitting regions 60$i$. Such information can be provided by the spectral analysis sensor 110 (FIG. 6), which as noted earlier can comprise an RGB sensor. In a preferred example, the intensity of red (R), green (G), and blue (B) wavelengths as reported from the sensor 110 are stored in the computer device 90 as a function of time, and may be presentable to the user as a graph, as shown in FIG. 7. To account for the fact that the intensity of the combined emission spectrum produced by the grow light 20 light may change from time to time as the drive currents Ii are adjusted, the RGB intensities measured by the sensor 110 are preferably normalized in accordance with those drive currents to understand how the measured intensities may be changing over time. In the example shown, notice that the measured normalized intensity of red and blue wavelengths are essentially constant, but the measured normalized intensity of green wavelengths is noticeable declining. That may be expected based on the types of light emitters used, or it may indicate a problem with those light emitters, perhaps warranting servicing of the grow light 20. LED performance aspect 170 may thus indicate such problems to the user, either in a graphical format as shown, or through the user of warning indicators and the like discussed further below.

The data logged under LED performance aspect 170 can also be used automatically by the computer system 90 to adjust the drive currents to compensate for light emitter 62$i$ degradation. Assume for example at time t1 that the LED performance data show that the intensity of green wavelengths are 20 percent lower than they should be due to degradation of the light emitters 62$i$ (e.g., 62$b$) that produce such wavelengths. In this case, the drive current sent to such light emitters (Ib) can be increased to compensate so that the desired combined emission spectrum 152 can be reliably produced. In a more complicated example, if the spectral analysis sensor 110 detects that the combined emission spectrum does not well match the desired combined emission spectrum 152, the computer device 90 can implement an algorithm to automatically and iteratively adjust the drive currents Ii until the measured spectrum best matches the desired spectrum 152.

Security 172 and temperature 173 aspects of the GUI 94 can allow the user to review data reported by the RFID reader 108 and the IR sensor 112 (FIG. 6) respectively. As with other aspects, aspects 172 and 173 may present information in graphical formats, or through the use of warning indicators or alarms as may be presented at alarm aspect 180. For example, a warning indicator might indicate that the plant tagged with RFID tag 15$b$ (FIG. 1) is missing, or is at a distant or incorrect location relevant to the grow light 20. Similarly, a warning indicator might indicate that temperature is lower or higher than specified temperature thresholds, which the user can optionally set at aspect 173. Another warning indicator may inform if LED performance 170 is out of spec, as determined by the spectral analysis sensor 110. These and other system warning indicators or alarms may be displayed at alarm aspect 180. In FIG. 7, alarm aspect 180 displays alarms in a textual manner, but other visual and audible indicators could be used as well.

Aspect 184 allows the user to control the irrigation system 19 (FIG. 1) that provides water and nutrients to the plants, such as to control the volumetric flow to the plants 10, control the time of day that the plants are watered, control the amount and type of nutrients provided to the plants, etc. Aspect 184 could also more generally be used to control an environmental control system for the plants as discussed earlier.

The grow light system may include more than one grow light 20, and aspect 190 allows a user to select different grow lights 20 supported by the system. Aspect 190 allows the user to select particular grow lights (e.g., 20$a$) so that each can be individually controlled and monitored using GUI 94. Aspect 190 may also allow the user to select a particular zone of grow lights 20 (e.g., Zone 1) and to display the various grow lights (e.g., 20$a$ and 20$b$) in that zone. Definition of the various grow lights 20 into different zones is discussed further below with respect to aspect 182.

Aspect 174 allows a user to select a type of plant 10 to be grown under one or more grow lights 20, and further details of this aspect of the GUI 94 are shown in FIG. 8. In this example, the user is presented a listing of different plant types and/or varieties of plants supported by the grow light system. For example, lettuce, parsley, *cannabis*, and tomatoes are shown as plants supported by the system, with lettuce, *cannabis*, and tomatoes each having different supported varieties (e.g., iceberg lettuce, red trout lettuce, and flame tip lettuce). Parsley for example has no varieties supported by the system. Although not shown, the system may support and list different groups (e.g., genuses) of plants (e.g., leafy vegetables), instead of particular plant species or their varieties.

A user may select any supported variety, plant, or group supported by the system, and the system will in turn retrieve optimal settings for each from library database 96 stored in the computer device 90. Such optimal settings may be derived using scientific data or experimentation—i.e., by observing which settings well grow a given variety, plant, or group. Optimal settings can also be determined by understanding which wavelengths are useful for growing different types of plants, and choosing or designing the light emitters $62i$ to produce such desired wavelengths. The library 96 can easily be updated with optimal settings for other varieties, plants, or groups as they become known. For example, the library 96 in the computer device 90 can from time to time be updated by an Internet server controlled by a manufacturer of the grow light system. The user can also store optimal setting data in the library 96, for example by using the storing aspect 154 (FIG. 7) discussed earlier.

As shown in FIG. 8, the optimal settings stored in library 96 preferably include, but are not limited to, the drive currents necessary Ii for each of the light emitting regions $60i$, and a distance d (vertical or angled) that the grow light should be positioned over the tops of the plants 10. For example, assume the user selects flame tip lettuce as shown. The computer device 90 will retrieve the optimal settings Ia3, Ib3, Ic3, etc., for the drive currents—i.e., the setting necessary produce a combined emission spectrum that has been determined best to grow flame tip lettuce, and which may also have a 405 nm antimicrobial component. The computer device 90 will also retrieve the optimal setting of distance d3. Once selected, the computer device 90 will automatically provide these optimal settings to the relevant grow light(s) 20. Specifically, the retrieved drive currents Ii will be sent to the lighting controller 42, and the distance will be sent to the cable hoist 34 to raise or lower the grow light 20 accordingly. As noted earlier, the retrieved optimal settings for the drive currents may be automatically adjusted based on light emitter degradation data (see 170, FIG. 7) before they are sent to the light controller 42. Note that information stored in library 96 may not necessarily be associated with a particular plant or variety. For example, Spectrum 7 may be useful to growing certain plants, or useful for other reasons, but has not been named for or associated with any particular plant or variety.

The optimal settings stored in library 96 may be constant values, as shown by dotted lines in the graphs of FIG. 8, or may also vary as a function of other parameters, as shown in solid lines. For example, the optimal settings may vary as a function of time (t) or height of the plant (h), which as noted earlier can be determined by a review of how much the cable hoist 34 has increased the height of the grow light 20 (168, FIG. 7). Time, and perhaps more precisely height, indicate where a particular plant is in its growth cycle. This can be important because different combined emission spectrums or different plant-to-grow light distances can be optimal at different phases of a plant's growth cycle. For example, the optimal distance data d3 for flame tip lettuce may increase over time, because these plants should be subject to more intense illumination (closer distances) in earlier growth phases and less illumination (larger distances) in later growth phases. Likewise, flame tip lettuce may in earlier growth phases grow better when Ib3 is larger, because the individual spectrum produced by light emitters $62b$ contains wavelengths that are more beneficial to the flame tip lettuce at that time. During a later growth phase when the flame tip lettuces plants are more mature, they may benefit more from wavelengths that predominate in the individual spectrum produced by light emitters $62a$, and thus Ia3 increases.

Library 96 may include other optimal settings as well. For example, and although not shown, the settings can include temperature limits for the variety, plant, or group, as necessary to trigger temperature alarms (173, FIG. 7). Settings may also include information regarding whether the plants are of a sensitive nature, such that security measures are necessary (172, FIG. 7). Setting in library 96 may also include information necessary to the pulsing of drive currents, such as the timing or duty cycle of such pulses. Setting can also include other variables as well, such as optimal temperatures, water and nutrition values, and other parameters that the computer device 90 may be able to control in the grow light system environment.

Figure 9:
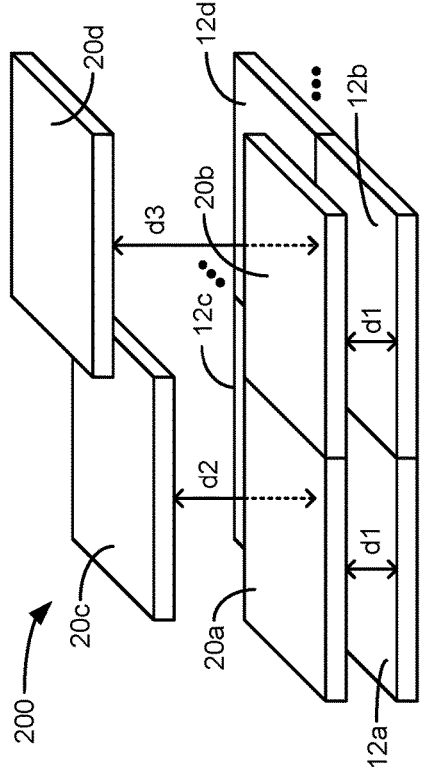
FIG. 9 shows use of a plurality of the disclosed grow lights in a grow farm setting.

As noted earlier, the grow light system can include more than one grow light 20 used in a grow farm 200 setting, such as is depicted in FIG. 9. In this example, four grow lights $20a$-$d$ are shown positioned over corresponding trays $12a$-$d$. Although not shown for simplicity, each of the trays $12a$-$d$ could have the same or different types of plants 10 growing under them. (Again, use of trays 12 is not required, and instead the grow lights $20a$-$20d$ can be placed over plants 10 in pots or in soil). As shown, the grow lights $20a$-$d$ are in a two dimensional array, and in an actual grow farm setting 200 there may be many more grow lights than the four shown. The grow lights 20 may also be differently arranged in the grow farm 200, such as in rows, etc. The computer device 90 communicates with each of the grow lights $20a$-$20d$ in the grow farm 200, which each light being registered to the computer device 90 with different password credentials. Because the computer device 90 in the grow light system may be remote, the grow farm 200 need not be in one particular location, but can be distributed with various grow lights 20 at different physical locations.

Returning again to FIG. 7, the GUI 94 may also present an aspect 182 to manage and define various zones of grow lights 20 in a grow farm setting 200. Selection of this option 182 can take the user to a zone management aspect of the GUI 94 as shown in FIG. 10. Because the same or different plants may be growing under the grow lights 20, it may be desirable that the computer device 90 provide the same or different control for various of the lights. Assume for example that iceberg lettuce is growing under lights $20a$ and $20b$, Roma tomatoes are growing under light $20c$, and parsley is growing under light $20d$. In this instance, it may be desirable to define different zones in the grow farm 200, which each zone being controlled by the computer device 90 independently. Thus, lights $20a$ and $20b$ can be defined as a first zone (Zone 1), light $20c$ as a second zone (Zone 2), and light $20d$ as a third zone (Zone 3). Of course, each zone could include any number of different grow lights 20, and grow lights within a zone do not need to be adjacent in the grow farm 200.

Definition and common control of such zones can occur in many different ways, but in the example of FIG. 10 the user can define a field map 186 showing a top-down view of the grow lights 20 in the grow farm 200. (This assumes the grow lights 20 in the system are in one location, but as noted earlier, that isn't strictly required. Field map 186 may also more generically identify each of the grow lights in the system without regard to physical location). Each grow light 20 shown can be individually selected, such as through the use of a cursor 202, to provide appropriate control to that light. For example, the user can use cursor 202 to select grow light $20d$ in Zone 3. The user can then select plant aspect 174, which as described earlier (FIG. 8) can allow the user to select a plant type or variety and to provide automatic control for grow light $20d$ appropriate for that selected plant type of variety. Here, it is assumed the user has selected "parsley," and so as discussed previously the computer device 90 will provide the appropriate control associated with this plant (e.g., Ia5, Ib5, Ic5, d5, etc.) from database 96 to grow light $20d$ as is optimal for growing parsley.

Likewise, the user can use the cursor 202 to select grow light 20c (Zone 2) to provide control for that light. In this example, the user has decided to manually control grow light 20c, rather than using the automatic control provided by the select plant aspect 174. Thus, the user selects manual control aspect 206, which as described earlier (FIG. 7) allows the user to define the individual drive currents (150) to produce a desired combined emission spectrum (152), to set the distance (156), and to control other aspects of grow light 20c. It is assumed that the user has stored his manual selections as "Spectrum 28" (154), and so this is reflected in the GUI 94 of FIG. 10. Again, the user could have also used the select plant aspect 174 and chosen "Roma tomatoes" to provide automatic control for grow light 20c.

Grow lights 20a and 20b—used to grow iceberg lettuce—may be commonly controlled, as this can occur by selecting common control aspect 204. Upon selection of this option, the user can use the cursor 202 to select various of the grow lights in the field map 186, such as by clicking on the relevant grow lights, or dragging the cursor to form a box over them. This defines these lights 20a and 20b within Zone 1. Thereafter, the user can select a method of common control for the lights in this zone. In the example shown, the user has decided on automatic control, and so has selected aspect 174 (FIG. 8), and selected "lettuce." Thus, appropriate control for growing lettuce in database 96 is provided by the computer device 90 to grow lights 20a and 20b (e.g., Ia1, Ib1, Id1, d1, etc.) in Zone 1. Manual control 206 could also have been used for Zone 1. Note that common control of grow lights within a zone does not necessarily mean that each of the grow lights will be operated exactly alike (although this too can occur). For example, despite common control, plants growing under one of the lights (e.g., 20a) may be growing faster than plants under another (e.g., 20b). Common control could then cause each of the grow lights to be lifted to different heights to maintain the optimal distance d specified in the database.

Once the various zones have been defined in aspect 182, they may be monitored or changed, for example by using aspect 190 (FIG. 7), which was previously explained.

One skilled in the art will understand that computer device 90 can include controller circuitry programmed to execute a grow light system software program functioning as described herein and to render and receive inputs from the GUI 94. Such controller circuitry can comprise one or more microprocessors, microcomputers, FPGAs, DSPs, other digital logic structures, etc., which are capable of executing programs in a computing device. In one example, controller circuitry may comprise an i5 processor manufactured by Intel Corp., as described at www.intel.com/content/www/us/en/products/processors/core/i5-processors.html. Such controller circuitry, in addition to executing the grow light system software, can also enable communications (e.g., via RF telemetry block 92, FIG. 6) with other aspects of the grow light system. One skilled in the art will understand that the grow light software can comprise instructions that can be stored on non-transitory machine-readable media, such as magnetic, optical, or solid-state memories within the computer device 90. Associated libraries (e.g., 96) and databases (e.g., 95) may also be stored on non-transitory machine-readable media, and perhaps the same medium that contains the grow light software.

Modifications can be made to the disclosed grow light system. For example, while it is desirable that the height of the grow light 20 be adjustable over the growing plants, such height adjustment need not necessarily occur using an elevator system with a cable hoist that suspends the grow light. Instead, the grow light 20 can be positioned on the top of an elevator system comprising an adjustable table structure which overlays the growing plants. Height control can then come from motors in one or more of the legs of the table that extend or lower the legs to place the grow light at the correct distance relative to the plants. The use of different types of adjustable elevator systems are also possible.

While the disclosed grow light and grow light system is particularly useful in the growing of plants, note that it is not limited to this application. Instead the grow lights and system can be used in situations requiring general illumination where it might be necessary or desirable to produce an emission spectrum that is adjustable. Further, the grow light and systems can be used in situations where it is desirable to provide both illumination and antimicrobial disinfection (e.g., in hospitals, operating rooms, places of food processing or preparation, etc.).

As used herein and in the claims, a "plant" should be understood as referring to a type of plant type, a plant variety, or group of plants.

Although particular embodiments of the present invention have been shown and described, it should be understood that the above discussion is not intended to limit the present invention to these embodiments. It will be obvious to those skilled in the art that various changes and modifications may be made without departing from the spirit and scope of the present invention. Thus, the present invention is intended to cover alternatives, modifications, and equivalents that may fall within the spirit and scope of the present invention as defined by the claims.

What is claimed is:

1. A grow light system, comprising:
   a grow light positionable over plants growing underneath, wherein the grow light comprises a circuit board, wherein the circuit board comprises a plurality of groups, wherein each group comprises a plurality of light emitters, wherein each group is configured to be driven with a unique current to cause the light emitters in that group to produce an individual emission spectrum that is different from the individual emission spectra produced by the light emitters in other groups, the sum of the individual emission spectrum from each group producing a combined emission spectrum; and
   at least one non-transitory computer readable medium configured to operate within a computer device in communication with the grow light, wherein the at least one non-transitory computer readable medium comprises:
      a library, wherein the library includes a plurality of plants, wherein each plant is associated in the library with values for the unique currents for each of the groups, and
      a grow light system software program configured when executed on the computer device to
         receive at the computer device a selection of a plant from the library, and
         in response to the selected plant, cause the computer device to transmit the values for the unique currents associated with the selected plant to the grow light to produce the combined emission spectrum.

2. The grow light system of claim 1, wherein the system includes the computer device, and wherein the at least one non-transitory computer readable medium is within the computer device.

3. The grow light system of claim 1, wherein the plurality of light emitters in each group are divided between a plurality of light emitting regions on the circuit board.

4. The grow light system of claim 3, wherein the plurality of light emitting regions in each group are driven in parallel by the unique current for that group.

5. The grow light system of claim 3, wherein there are a plurality of light emitters in each of the plurality of light emitting regions in each group.

6. The grow light system of claim 5, wherein the plurality of light emitters in each of the plurality of light emitting regions are connected in series.

7. The grow light system of claim 1, wherein the software program is configured to cause the computer device to transmit the values for the unique drive currents wirelessly.

8. The grow light system of claim 1, wherein the values for the unique currents for each of the groups is constant.

9. The grow light system of claim 1, wherein the values for the unique currents for each of the groups varies as a function of time or as a function of a height of the plants growing underneath.

10. The grow light system of claim 1, further comprising an elevator system configured to raise and lower the grow light over the plants.

11. The grow light system of claim 10, where the elevator system comprises a cable hoist, wherein the cable hoist is configured to suspend the grow light from a cable and to raise and lower the grow light by respectively retracting and extending the cable.

12. The grow light system of claim 10, further comprising a proximity sensor located on or within the grow light, wherein the proximity sensor is configured to determine a distance between the grow light and the plants growing underneath.

13. The grow light system of claim 12, wherein the software program is configured to cause the computer device to receive the determined distance from the proximity sensor.

14. The grow light system of claim 13, wherein each plant is further associated in the library with an optimal distance between the between the grow light and the plants growing underneath.

15. The grow light system of claim 14, wherein the optimal distance is constant.

16. The grow light system of claim 14, wherein the optimal distance varies as a function of time or as a function of a height of the plants growing underneath.

17. The grow light system of claim 14, wherein the software program is further configured to cause the computer device to transmit data to the elevator system to allow the elevator system to raise or lower the grow light so that the measured distance equals the optimal distance.

18. The grow light system of claim 1, wherein the light emitters in at least one of the groups produces an individual emission spectrum with a peak at a wavelength that is disruptive to microbial growth.

19. The grow light system of claim 18, wherein the wavelength is approximately 405 nm.

20. The grow light system of claim 1, further comprising a security sensor system located at least partially on or within the grow light, wherein the security sensor system is configured to determine the position or location of the plants growing underneath, and wherein the software program is configured to cause the computer device to receive the determined position or location.

21. The grow light system of claim 20, wherein the security sensor system comprises a Radio Frequency Identification (RFID) reader.

22. The grow light system of claim 21, wherein the security sensor system further comprises RFID tags attachable to the plants growing underneath.

23. The grow light system of claim 1, further comprising a spectral analysis sensor located on or within the grow light, wherein the spectral analysis sensor is configured to determine the intensity of the produced combined emission spectrum at at least a plurality of wavelengths, and wherein the software program is configured to cause the computer device to receive the determined intensities.

24. The grow light system of claim 1, further comprising an Infra-Red (IR) sensor located on or within the grow light, wherein the IR sensor is configured to determine the temperature of the plants growing underneath, and wherein the software program is configured to cause the computer device to receive the determined temperature.

* * * * *